(No Model.)

J. W. LIVERMORE.
Horse Hay Fork.

No. 233,524.                    Patented Oct. 19, 1880.

Witnesses:

Inventor:
John W. Livermore,
by his attys.,
Boone & Boone

UNITED STATES PATENT OFFICE.

JOHN W. LIVERMORE, OF KINGSBURG, CALIFORNIA.

HORSE HAY-FORK.

SPECIFICATION forming part of Letters Patent No. 233,524, dated October 19, 1880.

Application filed August 14, 1880. (No model.)

*To all whom it may concern:*

Be it known that I, JOHN W. LIVERMORE, of Kingsburg, Fresno county, and in the State of California, have invented an Improved Horse Hay-Fork; and I do hereby declare that the following is a full, clear, and exact description thereof, reference being had to the accompanying drawings.

My invention has reference to certain improvements in the construction of that class of horse hay-forks in which the head in which the tines or fingers are secured is attached to a bail by means of which the fork is suspended from a derrick, so that its load can be dumped by unlatching a trigger.

My invention consists, first, in connecting the middle of the fork-head with the middle of the bail by means of a vertical bar, so as to distribute the weight of the load more equally on the fork-head; secondly, in connecting the lower end of this vertical bar, and also the ends of the bail, with projecting lugs or ears, which embrace the bases of the tines, so that the weight of the load is, in a large measure, transferred from the wooden frame to the tines and the handling of the fork facilitated; and, lastly, in an improved trigger for disconnecting the frame from the bail in dumping the load.

Figure 1:
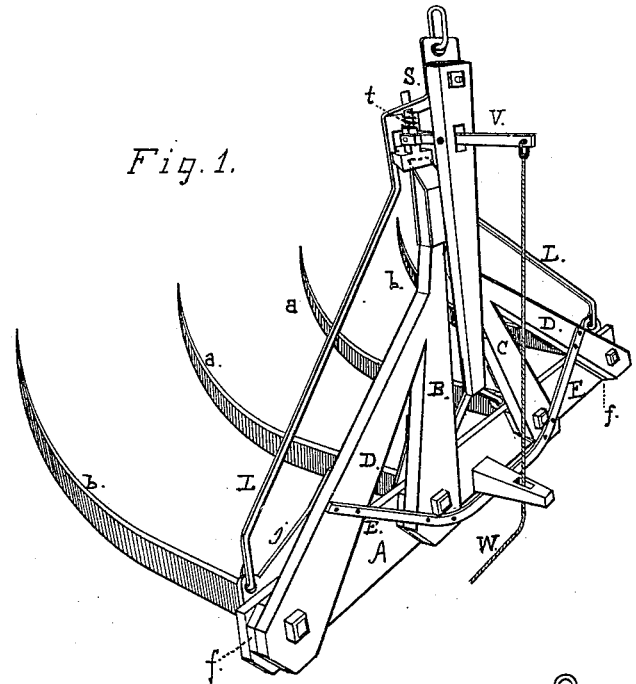
Figure 2:
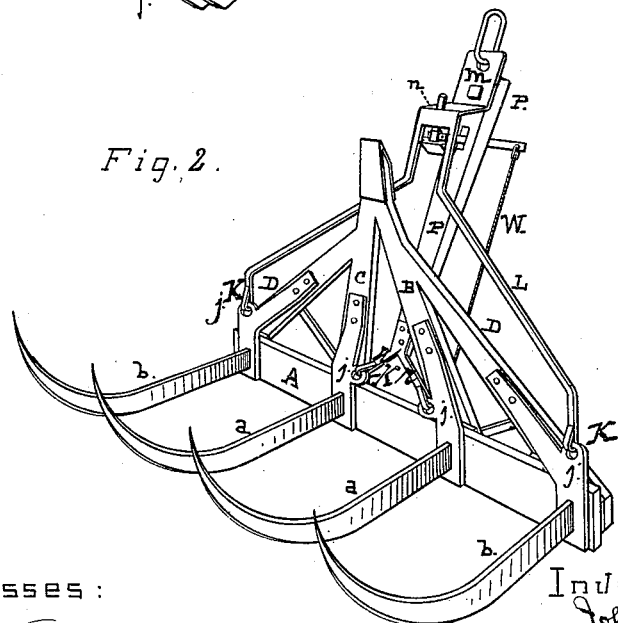

Referring to the accompanying drawings, Figure 1 shows the fork in position for raising a load. Fig. 2 shows the fork in position to discharge.

A is the wooden bar in which the tines of the fork are secured, and which forms the head of the fork. B C are two bars, the lower ends of which are secured to the head A in line with the two inside tines, *a a*, while their upper ends are connected together, thus forming a triangular frame above the middle of the fork-head. A brace-bar, D, has one end secured to the head A in the rear of each outside tine, *b*, of the fork, while their opposite ends are secured to the triangular bars B C, respectively, near their middles, as shown, and another brace bar or rod, E, connects the head with the middle of the brace-bars D at each end, as shown, thus forming a strong and substantial frame which is triangular in form above the fork-head.

In securing the lower ends of the bars B C and the two outer bars, D, to the wooden bar A, I interpose a wooden or other block, *f*, between the rear side of the bar A and the lower end of each of these angular bars, and I make the bolt-extension at the rear end of each tine long enough to pass through the bar A, block *f*, and the lower end of the angular bar or brace, and I then turn a nut, *g*, on the projecting end of the nut and screw it tightly against the rear brace or rod, thus firmly clamping them together and providing a long bearing for the tine-fastening, which is of great advantage in strengthening the fork. I then connect the base of each tine with the bar B, C, or D of the triangular frame, which extends upward in rear of it, by means of a strong brace, *j*, the lower end of which embraces the base of the tine in front of the head-bar A.

On each of the braces *j*, I make a projecting lug or ear, K, which extends slightly out from one side of the brace at a short distance above the head-bar. To the ears K of the outside braces I attach the ends of the bail L of the fork. The bail extends above the triangular frame B C, and has a plate, *m*, secured to its highest point above the apex of the triangular bars B C. This plate is bent backward and its opposite extremity is bent upward. A vertical bar, P, has its upper end secured to the upward-bent part of the plate *m*, and it extends down in rear of the triangular frame B C, and its lower end is connected by rods *r r* with the ears K on the braces of the two middle tines.

The hoisting-rope is attached to the upward-bent part of the plate *m*, so that the weight of the load is suspended by the hinged bail and vertical bar from the bases of all the tines equally, thus taking the weight off of the head of the fork.

A bolt, S, extends downward through the plate *m*, and a spring, *t*, presses it down, so that when the triangular frame B C is thrown back so as to raise the tines to their carrying position the apex of the frame, striking the inclined end of the bolt, will force it up until the point of the frame passes behind it, when the spring will force the bolt down in front of it, so as to retain it in position.

A lever, V, is pivoted in a slot in the upper end of the bar P, and one end is attached to the latch-bolt S, while the other end projects out to a distance from the bar and has the pull-rope W attached to it, so that when the load has been hoisted over the place of deposit it can be dumped by pulling the rope, so as to raise the latch and release the triangular frame. The tines will then drop and release their load.

I thus provide a derrick-fork that will not be twisted and broken by ordinary usage, as the strain is equally distributed and supported mainly from the tines, so that the wood-work is relieved.

Having thus described my invention, what I claim, and desire to secure by Letters Patent, is—

1. The fork-head A, with its tines $a\ b$, triangular frame B C, and braces D E, in combination with the bail L, hinged to the outside ends of the head, and the vertical bar P, hinged to the two middle tines, substantially as described.

2. The combination of the fork-head A with its tines $a\ b$, triangular frame B C, braces D E, braces $j$, having the eyes K, bar P, having forked arms $r$, and bail L, substantially as and for the purpose set forth.

3. The combination, with the triangular bail L, having a yoke-shaped slot at its upper end and a bent portion, $m$, of the spring-bolt S, having a beveled lower end and hung in the aforesaid slot and guided in the bail at its bent portion, lever V, rope W, and bar P, substantially as and for the purpose set forth.

In witness whereof I have hereunto set my hand and seal.

JOHN WILSON LIVERMORE. [L. S.]

Witnesses:
  GEO. A. PIERCE,
  EZRA J. POTTER.